(12) United States Patent
Naftel (10) Patent No.: US 8,185,684 B1
(45) Date of Patent: May 22, 2012

(54) METHOD AND APPARATUS FOR RESOLVING VOLUME IDENTIFIERS ASSOCIATED WITH A VIRTUAL MACHINE

(75) Inventor: Timothy Michael Naftel, Longmont, CO (US)

(73) Assignee: Symantec Corporation, Mountain View, CA (US)

( * ) Notice: Subject to any disclaimer, the term of this patent is extended or adjusted under 35 U.S.C. 154(b) by 1055 days.

(21) Appl. No.: 12/056,992

(22) Filed: Mar. 27, 2008

(51) Int. Cl.
  *G06F 13/00* (2006.01)
(52) U.S. Cl. ............ 711/6; 711/173; 711/E21.002
(58) Field of Classification Search ............ None
  See application file for complete search history.

(56) References Cited

U.S. PATENT DOCUMENTS

| | | | | |
|---|---|---|---|---|
| 5,896,546 | A * | 4/1999 | Monahan et al. | 710/10 |
| 7,606,868 | B1 * | 10/2009 | Le et al. | 709/211 |
| 2002/0198865 | A1 * | 12/2002 | Rafanello | 707/1 |
| 2004/0107422 | A1 * | 6/2004 | Cabrera et al. | 719/310 |
| 2008/0263658 | A1 * | 10/2008 | Michael et al. | 726/22 |

FOREIGN PATENT DOCUMENTS

EP 0751461 A2 * 2/1997

* cited by examiner

*Primary Examiner* — Hetul Patel
(74) *Attorney, Agent, or Firm* — Campbell Stephenson LLP (57) ABSTRACT

A method and apparatus for resolving volumes identifiers and drive letters associated with a virtual machine is described. In one embodiment, the method comprises correlating system registry information with at least one virtual drive configuration associated with a virtual machine image to produce a correlation result and mapping a volume identifier to at least one virtual drive based on the correlation result.

20 Claims, 5 Drawing Sheets

METHOD AND APPARATUS FOR RESOLVING VOLUME IDENTIFIERS ASSOCIATED WITH A VIRTUAL MACHINE

BACKGROUND OF THE INVENTION

1. Field of the Invention

Embodiments of the present invention generally relate to virtualization technologies, and, more particularly to a method and apparatus for resolving volume identifiers associated with a virtual machine.

2. Description of the Related Art

Various virtualization technologies are widely used across numerous organizations to efficiently use computer resources. Virtualization refers to a level of abstraction that represents several physical resources as a single resource and vice versa. A "virtualized" device breaks the traditional interdependence between physical and logical devices. In many computer systems for large and small organizations, best practices for the various virtualization technologies are being employed.

Window volumes are created on a hard disk by providing parameters to disk creation utilities such as F disk on Windows NT or Disk Druid on Linux. The parameters includes information such as partition type, volume name and volume size. The disks are partitioned for MICROSOFT Windows in accordance with one or more partition tables (e.g., Master Boot Record (MBR), Extended Boot Record (EBR), Globally Unique Identifier Partition Table (GPT) and the like). Each partition comprises one or more volumes (e.g., physical or logical volumes). One or more file system objects within each volume are organized by a file system, such as FAT32 (File Allocation Table with 32-bit cluster numbers) and/or NTFS (New Technology File System).

Currently, applications attempting to directly interpret the file systems of the raw virtual disk drives of a virtual machine are unable to display volume identifiers (e.g., Windows Drives such as C: or D: and the like). Information needed to display the volume identifiers is stored within the partition tables, but such information is insufficient for the applications to clearly identify all volumes. Neither the Master Boot Record nor the Extended Boot Record store the volume letter or volume GUID. The GUID Partition Table does store the volume GUID but not the volume letter. Only the Logical Disk Manager database specifies the drive letters or volume GUIDs. Consequently, the applications which are attempting to directly interpret the file systems within the virtual machine are unable to clearly identify the embedded volumes. Such a limitation fosters a difficulty in understanding the correlation between the raw partitions and actual volume identifiers for application users.

Therefore, there is a need in the art for a method and apparatus for resolving volume identifiers to enable file restoration from a virtual machine image in an efficient and cost effective manner.

SUMMARY OF THE INVENTION

Embodiments of the present disclosure, generally, comprise a method and apparatus for resolving volume identifiers associated with a virtual machine image. In one embodiment, a method of resolving volume identifiers associated with a virtual machine image comprises correlating system registry information with at least one virtual drive configuration associated with a virtual machine image to produce a correlation result and mapping a volume identifier to at least one virtual drive based on the correlation result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
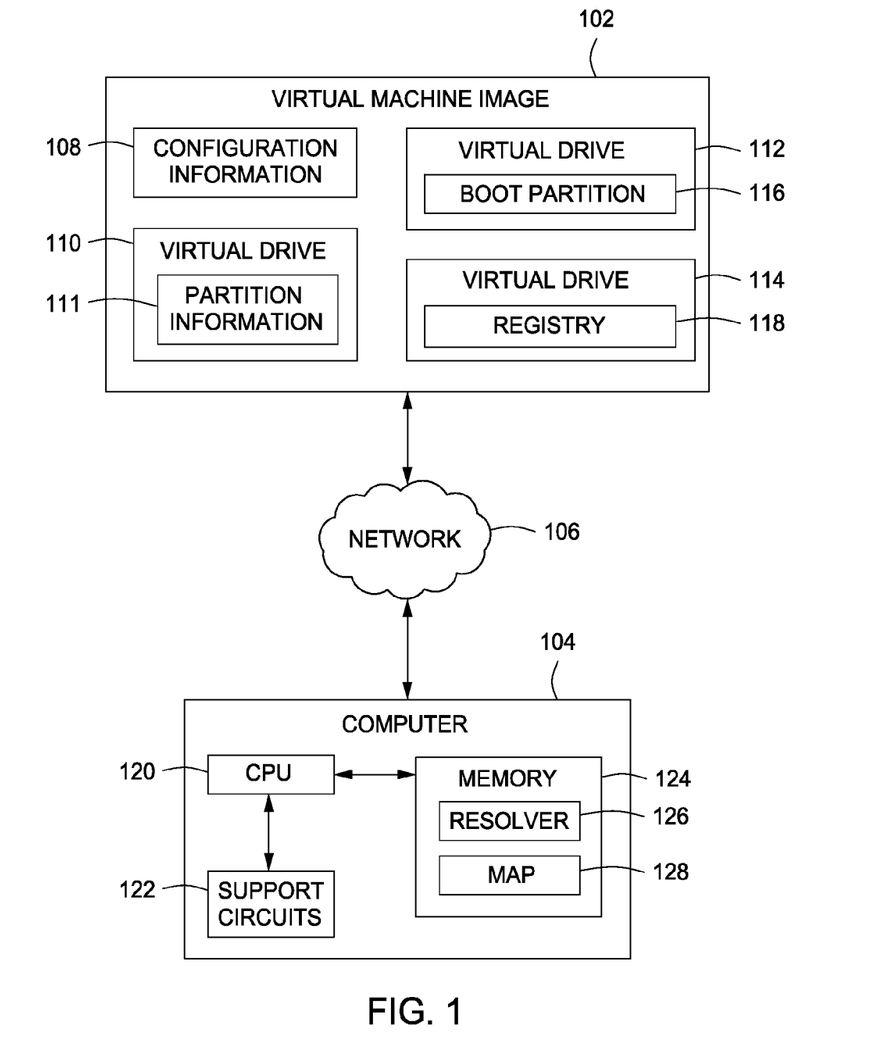
FIG. 1 is a block diagram depicting a system for resolving volume identifiers associated with a virtual machine according to one embodiment of the present invention.

FIG. 1 is a block diagram depicting a system 100 for resolving volume identifiers associated with a virtual machine, according to one embodiment of the present invention. The system 100 comprises a virtual machine image 102 and a client computer 104. The virtual machine image 102 and the client computer 104 are coupled to one another through a network 106.

The virtual machine image 102 is an image file (e.g., a disk image) that represents an entire virtual machine. Generally, the virtual machine image 102 stores software and data for operating the virtual machine. The virtual machine image 102 may be a single file (e.g., raw image file .IMG), multiple files (e.g., virtual machine disk files (.VMDK, .VHD and the like)), or directly recorded onto areas (e.g., sectors) of a physical storage medium. According to one embodiment, the virtual machine image 102 comprises configuration information 108 and one or more virtual disks, each of which may comprise one or more virtual drives files. As described further below, the one or more virtual drives files are associated with one or more partitions (e.g., volumes) for use by the virtual machine.

The client computer 104 may include a computing device (e.g., laptop, desktop, Personal Desk Assistant (PDA) and the like). The computer 104 further includes a Central Processing Unit (CPU) 120, various support circuits 122 and a memory 124. The CPU 120 may include one or more commercially available microprocessors or microcontrollers that facilitate data processing and storage. The various support circuits 122 facilitate operation of the CPU 120 and may include clock circuits, power supplies, input/output circuits and/or the like. The memory 124 includes a read only memory, random access memory, disk drive storage, optical storage, magnetic storage, removable storage, and the like. The memory 124 further includes various software packages, such as a resolver 126. The memory 124 further includes various data, such as a map 128.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS) and the like.

As mentioned above, the virtual machine image 102 comprises a virtual disk for representing physical storage (e.g., a data storage container such as a physical disk). As such, the virtual disk is defined by a geometry and configuration of the physical disk in terms of cylinders, heads and sectors. In one embodiment, the virtual disk is defined by a number of sectors per track (e.g., 63), a number of heads (e.g., 255) and a number of cylinders (e.g., 1024). A size of such a virtual drive file is determined by multiplying 63 sectors by 255 heads and by 1024 cylinders resulting in 16450560 sectors of storage space. Because 512 bytes is equivalent to one sector, there are about 8.4 gigabytes of storage space within the virtual disk.

Furthermore, the virtual disk may be partitioned such that specific portions of the virtual disk (e.g., disk regions or sector ranges) are associated with one or more primary partitions (e.g., physical volumes and drives) and/or secondary partitions (e.g., logical volumes). Similar to the physical hard disk, a first sector of the virtual disk may comprise a Master Boot Record (i.e., partition table) that indicates the one or more primary or secondary partitions, such as a boot partition (e.g., a boot volume) for booting the virtual machine, a system partition (e.g., system drive) for storing critical virtual machine information as well as one or more additional extended partitions. Each extended partition comprises one or more logical partitions (volumes).

Generally, the virtual disk organizes and encapsulates data in accordance with a number of formats (e.g., monolithic flat, vfmssparse, vfmsrawdevice and the like). According to one or more embodiments, the virtual disk comprises metadata (e.g., a descriptor file, configuration file, a .VMX file and the like) and a number of virtual drive files (e.g., VDMK or VHD files). The descriptor file comprises the geometry of the virtual disk, as mentioned above, as well as information regarding the virtual drive files (e.g., a size (in bytes or sectors), an address of a first sector (e.g., a logical address (i.e., Logical Base Address (LBA)), a physical address or a cylinder-head-sector address), a relative offset from a first sector in the virtual disk, access rights, a format, file names and the like).

According to various embodiments, the virtual machine image 102 (i.e., one or more virtual disks) comprises configuration information 108 (e.g., a configuration file, a descriptor file and the like), a virtual drive (file) 110, a virtual drive (file) 112 and a virtual drive (file) 114. The virtual drive 110, the virtual drive 112 and the virtual drive (file) 114 comprise one or more volumes and/or drives associated with the virtual machine represented by the virtual machine image 102. As described further below, the resolver 126 uses the configuration information 108 to identify the virtual drive 110, the virtual drive 112 and the virtual drive 114 and determine information regarding a number of sectors allocated to each virtual drive (i.e., size) as well as locations (i.e., offsets) of each virtual drive relative to the configuration information 108 (i.e., descriptor file).

The virtual drive 110 comprises partition information 111 (e.g., one or more partition tables that point to and describe one or more partitions of various partitions types within the virtual disk). The various partition types include a Master Boot Record (MBR), an Extended Boot Record (EBD), GUID Partition Table (GPT), a Logical Disk Manager (LDM) and the like. In one embodiment, the partition information 111 comprises a LDM database. The partition information 111 may describe boundaries for the one or more partitions (e.g., primary and secondary partitions). In one embodiment, the partition information 111 indicates a location of first sector of a partition (volume), a location of a last sector of the partition, a size of the partition, and an offset of the partition relative to a first sector (e.g., MBR) of the virtual disk. As such, the partition information 111 identifies a boot partition amongst the one or more partitions and/or indicates a location of the boot partition (e.g., in relation to the MBR).

The virtual drive 112 comprises boot partition information 116 that is associated with the boot partition of the virtual machine as indicated by the partition information 111, as mentioned above. The boot partition information 116 comprises one or more locations of one or more operating systems (e.g., a MICROSOFT WINDOWS XP operating system) on the virtual machine. In one embodiment, the boot partition information 116 comprises a "boot.ini" file of the virtual machine. As described below, the resolver 126 uses a boot sector of the boot partition (e.g., a first sector of the boot partition) to access the "boot.ini" file. Generally, the "boot.ini" file is a plain text file that is kept in the root directory of the boot partition (e.g., "boot.ini") and indicates a location of a system directory (i.e., MICROSOFT WINDOWS system directory). In one embodiment, the "boot.ini" file indicates a partition that comprises critical operating system information, such as a system registry. For example, the "boot.ini" file comprises a string that specifies a bus, a disk (i.e., virtual disk or physical disk), a partition and a path (i.e., a file system path comprising a root directories and any subdirectories) of the system directory.

The virtual drive 114 comprises a system registry 118 that is related to the operating system of the virtual machine. Generally, the registry 118 is a file which stores settings and options for the operating system. In one embodiment, the registry 118 is included below the system directory for which the boot partition information 116 indicates the location (e.g., the partition). As described above, the boot partition information 116 comprises the path of the system directory. As described further below, the resolver 126 uses the path to locate the partition that stores the system directory and access the registry 118.

The registry 118 is organized into logical hives or collections of various registry keys (i.e., folders) and registry values (i.e., name/data pair stored within the registry keys). The registry keys and values describe settings and information for operating system software, application software, hardware and the like. For example, a "MountedDevices" registry key comprises one or more registry values for describing one or more volumes in which each of the one or more volumes is identified by a letter and/or a GUID, respectively. As such, a first registry value may comprise an identifier of a particular volume as well as a signature of a disk and an offset of a particular partition of the disk. In one embodiment, the first registry value for a dynamic disk volume (e.g., partition type LDM) includes an internal GUID used as an identifier by the LDM that is different from the volume GUID used as an identifier for the operating system. Furthermore, a second registry value may comprise a drive letter that is assigned to the particular volume described in the first registry value. In addition, the particular volume may not be assigned to a drive letter. Hence, the second registry value may not be present in the registry 118 according to one embodiment.

In one embodiment, the virtual drive 110, the virtual drive 112 and the virtual drive 114 comprise one or more volumes or drives associated with the virtual machine (i.e., guest operating system). Generally, a volume is organized in accordance with a file system structure, such as a Master File Table (MFT), an iNode, a File Allocation Table (FAT) and the like. In one embodiment, because the partition information 111 points to or indicate a location of a first sector of the volume, the file system structure may be accessed and analyzed. As described further below, the resolver 126 analyzes or parses the file system structure of the volume specified by the boot partition information 116 (i.e., the partition that stores the system directory) in order to locate and access the registry 118 (e.g., a registry hive within the system registry).

Generally, each virtual drive is a file, such a .VMDK file, which encapsulates data for the virtual disk of the virtual machine according to a number of formats (e.g., sparse, flat, vfms and the like). In a flat virtual drive file, space is allocated in advance and data that is read or written sequentially without any structurally relationships. In one embodiment of the flat virtual drive file, data within in the file is a sector by sector copy of a partition of a physical disk. In a sparse virtual drive file, space is allocated as needed and not in advance. Hence, the sparse virtual drive file can grow or shrink in size. Furthermore, there are structurally relationships between various portions of the data in the sparse virtual drive file. In fact, the data within the sparse virtual drive file is organized in accordance with header information, which comprises grain directories and grain tables for grains (e.g., a pre-defined number of sectors of virtual machine data). Each grain directory comprises a plurality of entries that indicate locations of a plurality grain tables. Each grain table comprises a plurality of entries that indicate locations of a plurality of grains. Accordingly, the resolver 126 reads and analyzes the header information to determine locations (e.g., offsets) of one or more grains that comprise file data of the volume that is stored within the virtual drive files. For example, in order to access a particular key in the registry 118 (e.g., "MountedDevices"), the resolver 126 uses the grain directory to access a grain table that comprises an entry for locating a grain that comprises the particular key.

In operation, the resolver 126 is configured to resolve one or more drive letters and volume identifiers (e.g., Globally Unique Identifiers (GUID)) associated with the virtual machine (i.e., guest operating system) represented by the virtual machine image 102. According to various embodiments of the present invention, the resolver 126 correlates information within the registry 118 (e.g., registry values) with various data associated with one or more virtual disks of the virtual machine. The various data may be a portion of the configuration information 108 and/or the partition information 111. For example, the resolver 126 correlates data within the registry values under the "MountedDevices" registry key with (virtual or physical) disk signatures, partition boundaries (e.g., offsets) and internal dynamic disk identifiers in a Logical Disk Manager database and/or the like.

The resolver 126 performs such a correlation to map volume identifiers (e.g., drive letters and volume GUIDs) to one or more partitions within the one or more virtual disks. The resolver 126 creates the map 128 to store such mappings. The map 128 is used by the client computer 104 to display the volume identifiers next to one or more corresponding virtual drives and/or to restore data (e.g., files) from the virtual machine image 102, according to one embodiment of the present invention.

In one embodiment of the present invention, the resolver 126 examines the configuration information 108 to identify the virtual drive 110, the virtual drive 112 and the virtual drive 114 as well as a format type, a size and/or an offset of each virtual drive. If the virtual drive 110, the virtual drive 112 and/or the virtual drive 114 are sparse virtual machine disk files, the resolver 126 reads and examines the header information (i.e., grain directories and grain tables for one or more grains of data), as described above.

Subsequently, the resolver 126 examines a Master Boot Record (MBR) for the each virtual drive (e.g., the virtual drive 110, the virtual drive 112 and the virtual drive 114) to determine one or more partitions and partition types. In one embodiment, the resolver 126 compares the partition information 111 with the configuration information 108 to associate a virtual drive with a partition. For example, if a particular partition (volume) has an offset of 63 sectors from a first sector of the virtual disk and the virtual drive 110 has an offset of zero or one sector, then the virtual drive 110 is associated with the particular partition. In other words, the virtual drive 110 comprises data for a volume related to the particular partition.

Based on such associations, the resolver 126 determines that the virtual drive 112 comprises the boot partition according to one embodiment. Then, the resolver 126 determines a file system format of the boot partition (e.g., NTFS or FAT). In either case, the resolver 126 parses a file system structure (e.g., the File Allocation Table (FAT) or the Master File Table (MFT)) to locate and access the boot partition information 116 (e.g., boot.ini file or Boot Configuration Data (BCD) hive). In one embodiment, the resolver 126 examines one or more directory entries associated with a root directory index (i.e., MFT record 5) to determine an index of the boot partition information 116. Subsequently, the resolver 126 processes a MFT record associated with the boot partition information 116 to access various resident and non-resident portions (e.g., of data) of the boot partition information 116. Furthermore, the resolver 126 processes the boot partition information 116 to identify the virtual drive 114 as the virtual drive file comprising the system directory, which comprises the registry 118. Similarly, the resolver 126 parses a file system structure of the virtual drive 114 to locate the registry 118.

Subsequently, the resolver 126 accesses the registry 118, which includes registry values under the registry key "MountedDevices". As mentioned above, the registry values comprise information regarding the volumes used by the virtual machine. In one embodiment, the resolver 126 compares such information with the configuration information 108 and the partition information 111 to match the volume letters and/or the volume GUIDs to the appropriate virtual disks and the partitions. For example, a drive "D:" is assigned to a volume {2ea3c400-c92a-4172-9286-de46dda1098a} and such a volume is stored on a partition with an offset of 1000 sectors on a virtual disk with a signature (i.e., MBR disk signature) of 0x12345678. A virtual drive "vmdrive.vmdk" is a VMWARE Virtual Disk file that has an offset of 500 sectors and a size of 10000 sectors on a virtual disk with a MBR disk signature of 0x12345678. Based on the information above, the resolver 126 maps the virtual drive "vmdrive.vmdk" with the volume {2ea3c400-c92a-4172-9286-de46dda1098a} and the drive "D:\" due to matching signatures of the virtual disk and corresponding locations between the virtual drive "vmdrive.vmdk" and the partition. Such a mapping may be used during a restoration of any file within the volume from the virtual drive "vmdrive.vmdk".

Figure 2:
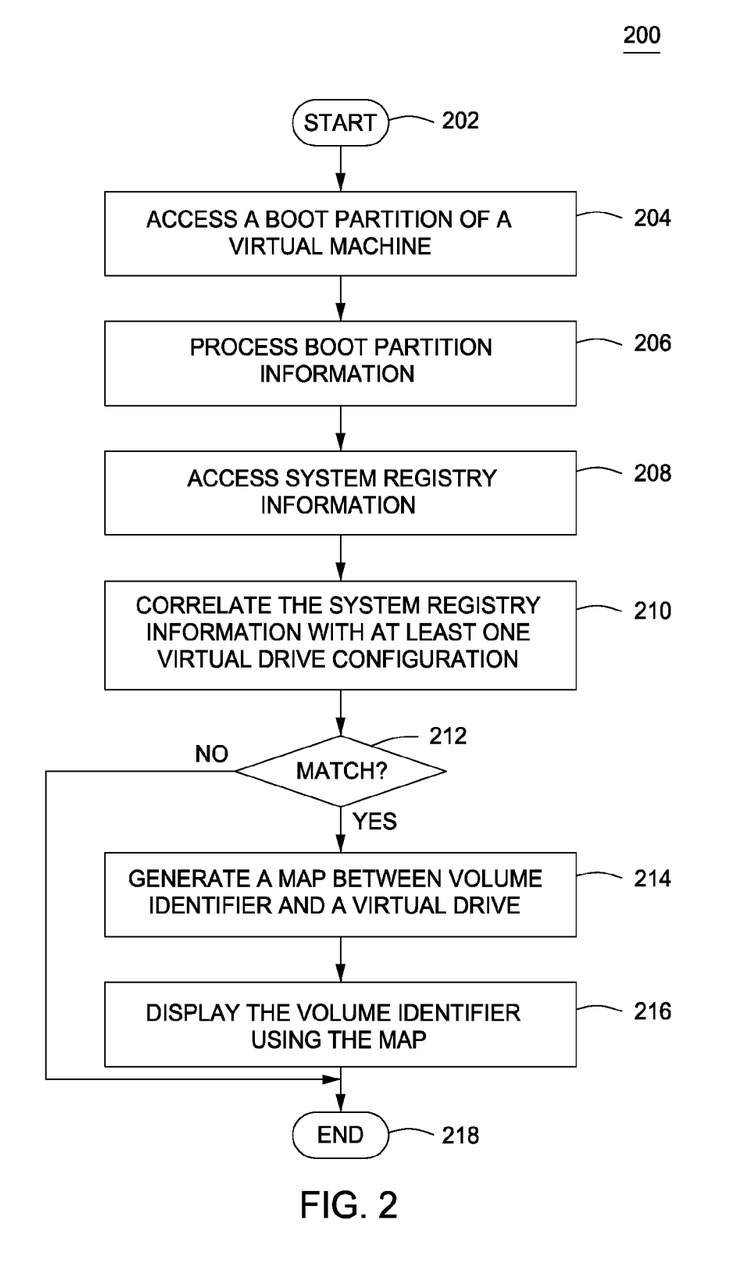
FIG. 2 is a flow diagram depicting a method for resolving volume identifiers associated with a virtual machine according to one embodiment of the present invention.

FIG. 2 is a flow diagram of a method 200 for resolving volume identifiers associated with a virtual machine, according to one embodiment of the present invention. The method 200 starts at step 202 and proceeds to step 204. At step 204, a boot partition of a virtual machine is accessed. As mentioned above, a virtual drive (e.g., the virtual drive 112 of FIG. 1) that includes the boot partition is accessed.

At step 206, the boot partition information associated with the virtual machine is processed. As mentioned above, the boot partition information indicates a location of a system directory which identifies the location of a system registry. In one embodiment, the boot partition information is compared with partition information and/or configuration information associated with the virtual drive files to identify the virtual drive that comprises the system registry.

At step 208, system registry information is accessed. In one embodiment, registry values under the registry key "MountedDevices" are accessed. The registry key "MountedDevices" comprises information regarding volumes used within the virtual machine including drive letters and volume GUIDs. At step 210, the system registry information is correlated with at least one virtual drive configuration. As described above, registry values for the registry key "MountedDevices" is correlated with information regarding partitions of the virtual disk (e.g., the partition information 111 of FIG. 1) and/or information regarding configurations of the at least one virtual drive (e.g., the configuration information 108 of FIG. 1). For example, a disk signature associated with a particular volume GUID is compared with at least one disk signature related to the at least one virtual drive to determine a match between a particular virtual drive and the particular volume GUID.

At step 212, a determination is made as to whether there is a match. If there is a match, then the method 200 proceeds to step 214. If there is no match, then the method 200 proceeds to step 218. At step 214, a map is generated comprising a mapping between a virtual drive and a volume identifier. The volume identifier may be a drive letter and/or a volume GUID. At step 216, the volume identifier is displayed using the map. In one embodiment, the volume identifier is displayed to enable a restoration process. At step 218, the method 200 ends.

Figure 3:
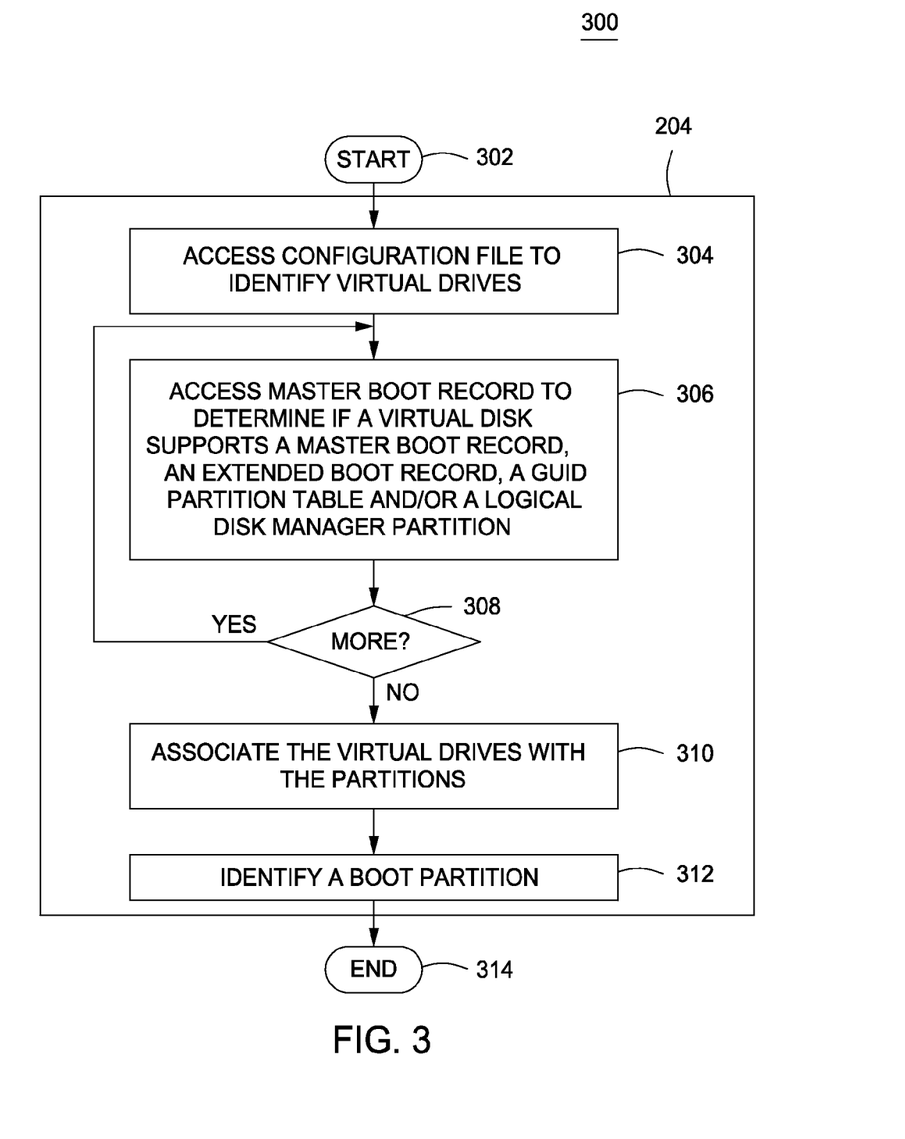
FIG. 3 is a flow diagram depicting a method for accessing a boot partition of a virtual machine according to one embodiment of the present invention.

FIG. 3 is a flow diagram of a method 300 for accessing a boot partition of a virtual machine according to one embodiment of the present invention. The method 300 begins at step 302 and proceeds to step 304. The method 300 is an embodiment of the step 204 of the method 200.

At step 304, a configuration file is accessed to identify one or more virtual drives. At step 306, a Master Boot Record is accessed to determine if a virtual disk supports a Master Boot Record, an Extended Boot Record, a GUID partition Table, and/or a Logical Disk Manager partition. At step 308, a determination is made as to whether there are more virtual disks to process. If there are more virtual disks, the method 300 returns to step 306. If there are no more virtual disks, the method 300 proceeds to step 310. At step 310, the one or more virtual drives are associated with the partitions. At step 312, a virtual drive comprises a boot partition is identified based on the virtual drive and partition associations. At step 314, the method 300 ends.

Figure 4:
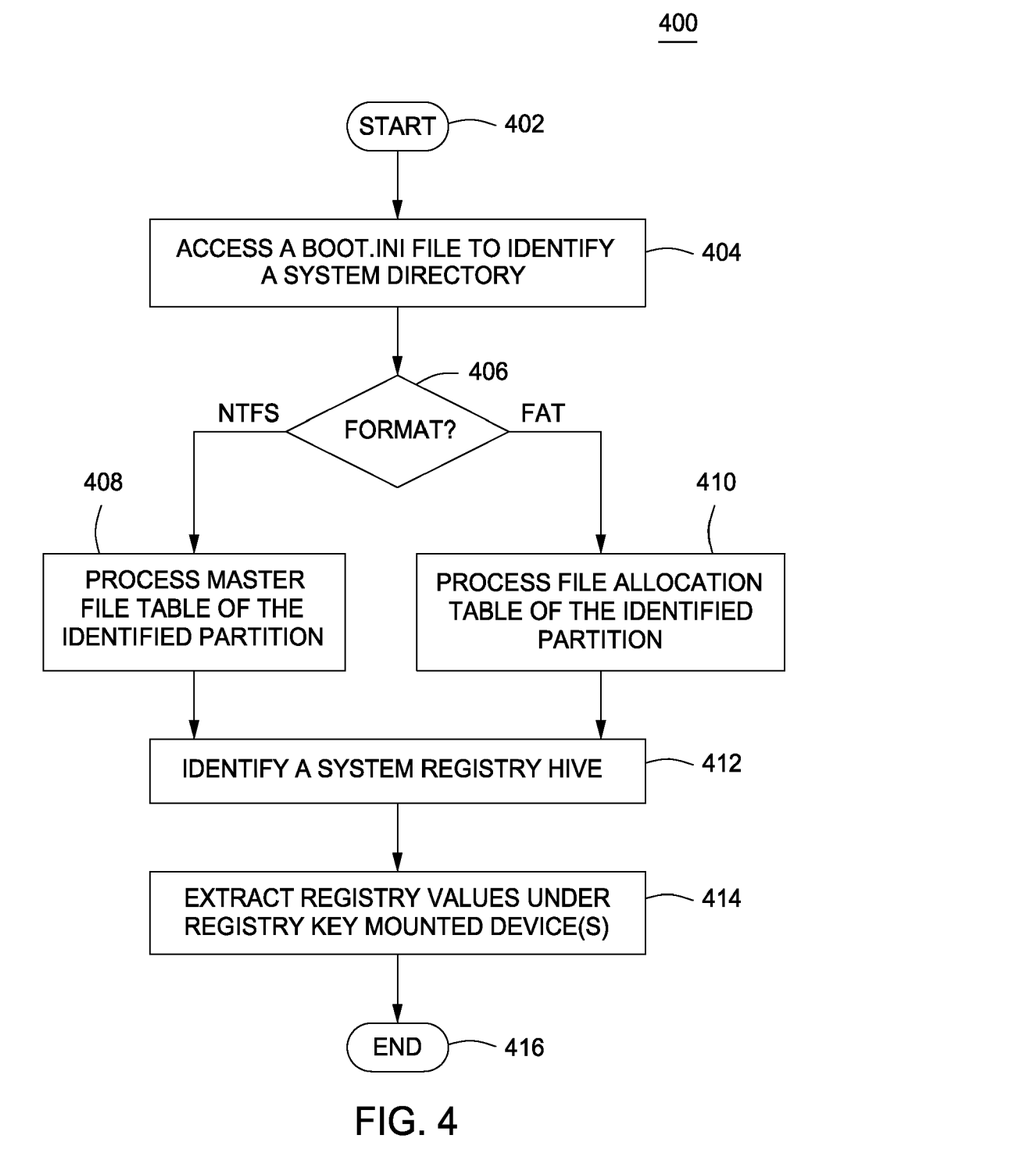
FIG. 4 is a flow diagram depicting a method for accessing a system registry according to one embodiment of the present invention.

FIG. 4 is a flow diagram of a method 400 for accessing a system registry according to one embodiment of the present invention. The method 400 begins at step 402 and proceeds to step 404.

At step 404, a "boot.ini" is accessed to identify a system directory. As described above, the "boot.ini" is used to determine and access a virtual drive that stores the system directory by examining partitions associated with the virtual drive. If a partition associated with the virtual drive matches a partition identified in the "boot.ini" file, then the virtual drive comprises the system directory. At step 406, a determination is made as to whether a file system format of the identified partition is NTFS or FAT. If the file system format is NTFS, the method 400 proceeds to step 408. At step 408, a Master file table of the identified partition is processed. If the file system format is FAT, the method 400 proceeds to step 410. At step 410, a File Allocation Table of the identified partition is a processed. At step 412, a system registry hive is identified. At step 414, registry values under the registry key "MoundedDevices( )" is extracted. At step 416, a method 400 ends.

Figure 5:
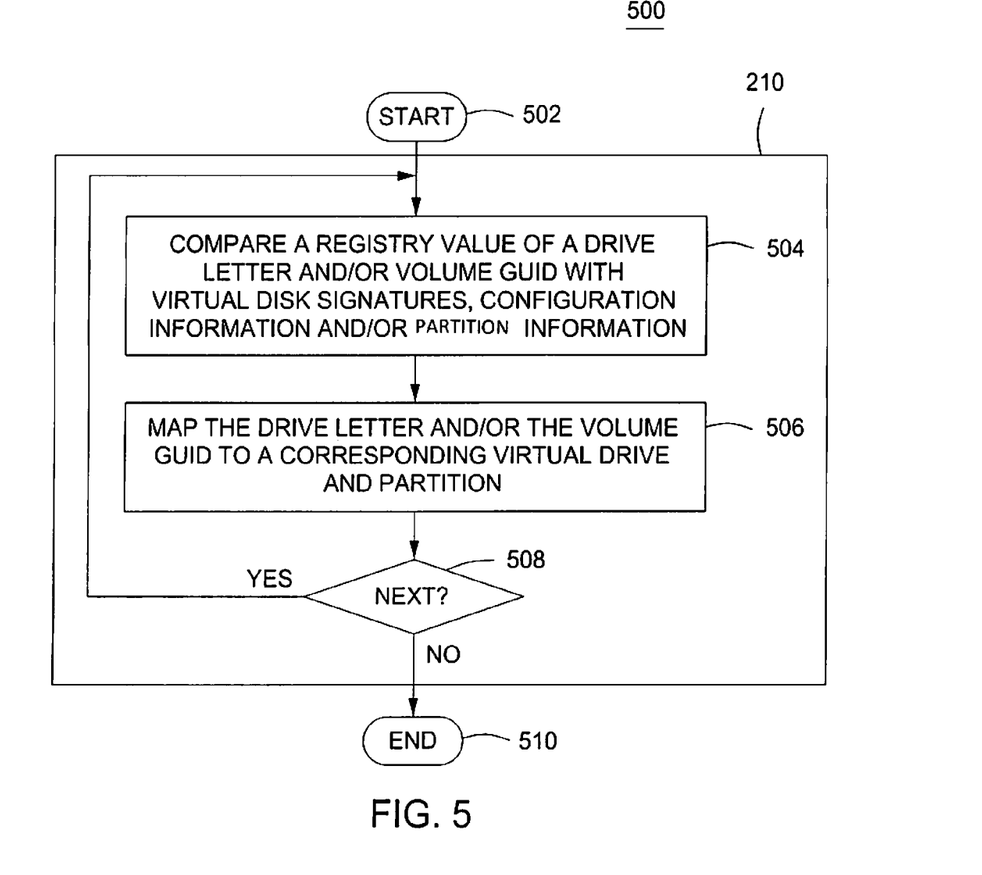
FIG. 5 is a flow diagram depicting a method for correlating the system registry information with configurations of virtual drives and partitions of virtual disks according to one embodiment of the present invention.

FIG. 5 is a flow diagram of a method 500 for correlating system registry information with configurations of virtual drives and partitions of virtual disks. The method 500 is an embodiment of the step 210 of the method 200. The method 500 begins at step 502 and proceeds to step 504.

At step 504, a registry value for a volume GUID and/or a drive letter is compared with virtual disk signatures, configuration information associated with one or more virtual drives and/or partition information associated with one or more virtual disks. At step 506, the volume GUID and/or drive letter is mapped to a corresponding virtual drive and partition. At step 508, a determination is made as to whether there are more registry values. If there are more registry values, the method 500 returns to step 504. If there are no more registry values, then the method 500 proceeds to step 510. At step 510, the method 500 ends.

While the foregoing is directed to embodiments of the present invention, other and further embodiments of the invention may be devised without departing from the basic scope thereof, and the scope thereof is determined by the claims that follow.

The invention claimed is:

1. A method of resolving volume identifiers associated with a virtual machine image, comprising:
    correlating system registry information with at least one virtual drive configuration associated with the virtual machine image to produce a correlation result; and
    mapping a volume identifier to at least one virtual drive based on the correlation result.

2. The method of claim 1, wherein the correlating the system registry information further comprises:
    associating a virtual drive of the at least one virtual drive with a partition of a virtual disk associated with the virtual machine image.

3. The method of claim 1, further comprising:
    processing boot partition information associated with the virtual machine image to indicate a location of a partition that comprises the system registry information; and
    accessing the system registry information.

4. The method of claim 3, wherein the processing the boot partition information further comprises:
    determining a file system format of a boot partition.

5. The method of claim 3, further comprising:
    determining a format of a virtual drive of the at least one virtual drive.

6. The method of claim 3, wherein the processing the boot partition information further comprises:
    comparing the boot partition information with the at least one virtual drive configuration to identify a virtual drive that comprises the system registry information.

7. The method of claim 3, wherein the processing the boot partition information further comprises:
accessing configuration information associated with the at least one virtual drive.

8. The method of claim 3, wherein the processing the boot partition information further comprises:
identifying a sparse virtual drive from the at least one virtual drive; and
analyzing header information of the sparse virtual drive to determine locations of data stored within the sparse virtual drive.

9. The method of claim 3, wherein the processing the boot partition information further comprises:
accessing a master boot record associated with each virtual drive of the at least one virtual drive, wherein the master boot record comprises a master partition table; and
examining partition information specifying a number of partitions, a partition type, and locations of the number of partitions within a virtual disk to determine a corresponding virtual drive of the at least one virtual drive for each partition of the number of partitions, wherein the number of partitions form at least a portion of the at least one virtual drive.

10. The method of claim 9, wherein the processing the boot partition information further comprises:
identifying a boot partition from the number of partitions and determining a boot partition format based on the partition information.

11. The method of claim 10, wherein the processing the boot partition information further comprises:
processing a boot sector and a file system structure associated with the boot partition to identify the boot partition information.

12. The method of claim 3, wherein the accessing the system registry information further comprises:
parsing a file system structure of the partition that stores the system registry information to identify a location of the system registry information within the partition.

13. The method of claim 1, wherein the correlating the system registry information further comprises:
comparing a system registry value with at least one of a disk signature, logical disk information, partition information, or configuration information to match at least one of a drive letter or a volume globally unique identifier with a virtual drive and a partition.

14. The method of claim 1, further comprising:
accessing a file from the virtual machine image using the mapping between the at least one virtual drive and the volume identifier.

15. The method of claim 1, wherein the volume identifier comprises:
a drive letter and a volume Globally Unique Identifier.

16. An apparatus for resolving volume identifiers associated with a virtual machine image, comprising:
a memory comprising a map between a volume identifier and a virtual drive, wherein the virtual drive forms a portion of the virtual machine image; and
a resolver for comparing system registry information with configuration information associated with at least one virtual drive and partition information associated with at least one partition to generate the map.

17. The apparatus of claim 16, wherein the resolver associates the virtual drive with a partition of the at least one partition of a virtual disk associated with the virtual machine image.

18. The apparatus of claim 16, wherein the resolver correlates a system registry value with at least one of a disk signature, logical disk information, partition information, or configuration information to match at least one of a drive letter or a volume globally unique identifier with the virtual drive and a partition of the at least one partition.

19. A system for resolving volume identifiers associated with a virtual machine image, comprising:
the virtual machine image, wherein the virtual machine image comprises at least one virtual drive, and the at least one virtual drive is associated with at least one partition of a virtual disk; and
a client computer, comprising:
a resolver for correlating system registry information with at least one virtual drive configuration to determine a match between a volume identifier and a virtual drive of the at least one virtual drive and storing the match in a map.

20. The system of claim 19, wherein the map is used by the client computer to access at least one file from the virtual machine image.

* * * * *